US008530368B2

(12) United States Patent
Mathur et al.

(10) Patent No.: US 8,530,368 B2
(45) Date of Patent: *Sep. 10, 2013

(54) BLENDED HYDROUS KAOLIN CLAY PRODUCT

(75) Inventors: Sharad Mathur, Tega Cay, NC (US); Michael B. Sigman, Haddock, GA (US)

(73) Assignee: BASF Corporation, Florham Park, NJ (US)

( * ) Notice: Subject to any disclaimer, the term of this patent is extended or adjusted under 35 U.S.C. 154(b) by 450 days.

This patent is subject to a terminal disclaimer.

(21) Appl. No.: 12/707,972

(22) Filed: Feb. 18, 2010

(65) Prior Publication Data
US 2010/0192807 A1 Aug. 5, 2010

Related U.S. Application Data

(63) Continuation-in-part of application No. 12/543,228, filed on Aug. 18, 2009, now Pat. No. 8,129,302.

(60) Provisional application No. 61/090,024, filed on Aug. 19, 2008.

(51) Int. Cl.
B01J 21/16 (2006.01)
C04B 14/10 (2006.01)

(52) U.S. Cl.
USPC .......... 502/80; 502/87; 502/60; 502/63; 502/72; 106/486

(58) Field of Classification Search
USPC .......... 502/60, 63, 72, 80, 87; 106/486
See application file for complete search history.

(56) References Cited

U.S. PATENT DOCUMENTS

| | | | |
|---|---|---|---|
| 6,319,870 B1 | 11/2001 | Beall et al. | |
| 6,506,336 B1 | 1/2003 | Beall et al. | |
| 6,652,642 B2 * | 11/2003 | Sare et al. | 106/486 |
| 2002/0088376 A1 * | 7/2002 | Sare et al. | 106/486 |
| 2002/0115556 A1 | 8/2002 | Stockwell et al. | |
| 2007/0272593 A1 | 11/2007 | Stockwell et al. | |

FOREIGN PATENT DOCUMENTS

| | | |
|---|---|---|
| EP | 0549885 A1 | 7/1993 |
| EP | 0894777 A1 | 2/1999 |
| EP | 1200369 B1 | 8/2006 |
| WO | 9850161 A1 | 11/1998 |
| WO | WO 98/50161 * | 11/1998 |
| WO | 0104070 A1 | 1/2001 |
| WO | 2005019349 A2 | 3/2005 |
| WO | WO 2005/019349 * | 3/2005 |

OTHER PUBLICATIONS

Office Acton dated May 4, 2011 in U.S. Appl. No. 12/543,228, filed Aug. 18, 2009.
Office Action dated Dec. 13, 2010 in U.S. Appl No. 12/543,228, filed Aug. 18, 2009.
Office Action dated Oct. 1, 2010 in U.S. Appl No. 12/543,228, filed Aug. 18, 2009.
International Search Report dated Jun. 24, 2010 in WO 2010/022115.
Office Action dated Sep. 29, 2011 in U.S. Appl. No. 12/543,228, filed Aug. 18, 2009.
International Preliminary Report on Patentability dated Feb. 11, 2011 in PCT/US2009/054251.
International Search Report dated Feb. 24, 2010 in PCT/US2010/024530.
International Preliminary Report on Patentability dated Feb. 21, 2012 in PCT/US2010/024530.

* cited by examiner

*Primary Examiner* — Elizabeth Wood
(74) *Attorney, Agent, or Firm* — Lauia DiLorenzo

(57) ABSTRACT

The disclosed invention relates to a blended hydrous kaolin clay product comprising a platy coarse kaolin clay and a fine, hydrous kaolin clay. The blended kaolin clay product is suitable for use as a raw material component in the formation of cordierite products.

11 Claims, No Drawings

BLENDED HYDROUS KAOLIN CLAY PRODUCT

CROSS REFERENCE TO RELATED APPLICATIONS

This application is a continuation-in-part of U.S. application Ser. No. 12/543,228, filed Aug. 18, 2009, issued as U.S. Pat. No. 8,129,302 on Mar. 6, 2012, which in turn claims benefit under 35 U.S.C. §119(e) of U.S. provisional application U.S. Ser. No. 61/090,024, filed Aug. 19, 2008, each of whose contents are incorporated herein by reference in their entireties.

FIELD OF THE INVENTION

This invention is related to a kaolin product as a raw product for use in specialized applications. In particular, this invention is related to a blended hydrous kaolin clay product for use as a raw material component in the formation and sintering of cordierite ceramic honeycombs with enhanced thermal properties.

BACKGROUND OF THE INVENTION

Cordierite ($Mg_2[Al_4Si_5O_{18}]$) ceramics are the preferred materials for use in automotive catalytic substrates, diesel particulate filter applications, and other high temperature articles, such as $NO_x$ adsorber substrates, catalyst substrates, and honeycomb articles due to the combination of their low cost of production and physical properties such as low coefficient of thermal expansion (CTE) and resistance to thermal shock.

Cordierite substrates are typically produced from naturally occurring minerals such as talc and kaolin due to their lower cost and high purity. Cordierite materials are typically manufactured by mixing a raw batch that includes talc, alumina, aluminum hydroxide, kaolin and silica. The batch is then blended with a binder (such as methylcellulose) and a lubricant (such as sodium stearate) to form a plastic mixture. This plastic mixture is then formed into a green body and sintered.

The cordierite crystal structure consists of a hexagonal ring of tetrahedra that are joined at each intersection of the hexagonal ring by five silicon and one aluminum atom. The hexagonal rings are connected together by additional aluminum tetrahedral and magnesium octhedra resulting in two interstitial vacancies per unit cell that are oriented along the c-axis of the crystal structure. See, B. P. Saha, R. Johnson, I. Ganesh, G. V. N. Rao, S. Bhattacharjee, T. R. Mahajan; Materials Chemistry and Physics, 67 (2001), 140-145. The interstitial vacancies result in a contraction along the c-axis of the crystal structure and an expansion along the a- and b-axes with increasing temperature. See, R. J. Beals, R. L. Cook, J. Am. Ceram. Soc., 35(2), (1952), 53-57. The anisotropic CTE resulting from the cordierite crystal structure offers the opportunity to engineer improved cordierite honeycombs by orienting the c-axis of the individual crystals within the Ceramic in the direction of extrusion. Cordierite crystal orientation has been observed to cause a significant net decrease in the overall CTE of the ceramic honeycomb. See, I. M. Lachman, R. M. Lewis, U.S. Pat. No. 3,885,977, May 27, 1975; and R. Johnson, I. Ganesh, B. P. Saha, G. V. Narasimha Rao, Y. R. Mahajan, J. Mater. Sci., 38 (2003), 2953-61.

In order to orient the cordierite crystals within the ceramic, platy raw materials are used. In particular, talc and kaolin have platy crystal structures that may be preferentially oriented parallel to the direction of extrusion when passed through an extrusion die at high pressure. Delamination of hydrous kaolin may be utilized to increase the platyness of the clay increasing alignment during extrusion. Subsequent sintering of the green body results in the formation of a ceramic with preferential orientation of cordierite crystals within the honeycomb structure oriented along the c-axis relative to the extrusion direction. See, I. M. Lachman et al., U.S. Pat. No. 4,772,580, Sep. 20, 1988. Although talc and kaolin both play a role in orienting the sintered cordierite crystal structure, kaolin is considered to be the most significant contributor because it provides the only source of ordered aluminum within the green body. Since silicon comes from both talc and kaolin raw material sources and magnesium (talc as the source) makes up a smaller atomic and weight percent of the final cordierite crystal, aluminum (derived from kaolin) is expected to have the greatest contribution to the final cordierite crystal structure. See, Saha et al.

One drawback with producing a highly ordered cordierite substrate is that the difference in thermal expansion along the axial and transverse directions in the honeycomb becomes so large that cracking occurs resulting in reduced thermal shock resistance. See, Saha et al. Although this is a concern for catalyst substrates, it is of particular significance to honeycombs produced for diesel particulate filter applications where increased porosity lowers the shock resistance of the resulting ceramic. In addition, the extrusion of highly oriented raw materials parallel to the axial direction of the substrate lowers the strength of the green body resulting in sagging of the body, particularly in thin wall applications. To alleviate these problems, calcined clay is typically added in combination with delaminated hydrous clay to moderate particle alignment within the green body and subsequent cordierite crystal alignment within the sintered ceramic. Calcination produces a coarser particle that is less platy in nature particularly compared to delaminated hydrous clay.

SUMMARY OF THE INVENTION

This invention is directed to a blended hydrous kaolin clay product comprising a platy kaolin clay with a mean particle size of less than about 2 um in diameter, and a fine hydrous kaolin clay with a mean particle size less than about 1 um in diameter. In an embodiment, the platy kaolin clay is a delaminated kaolin clay. The resulting clay product can be used as a raw material component in the formation and sintering of cordierite substrates, for example, ceramic honeycombs. The particle size of the kaolin clay may be measured by a Micromeritics Sedigraph Model 5100 instrument.

This invention is also directed to a method of forming a blended hydrous kaolin clay product, the method comprises blending clay mined from tertiary crude deposits as the fine component; and Cretaceous or secondary clay. The blended kaolin clay product comprises tertiary kaolin where about 75% or more of the total particle mass is less than about 2 um and more than about 55% of the total particle mass is less than about 1 um and would be suitable for improved cordierite production. It comprises mixing a coarse component containing less than 85% of the total particle mass less than about 2 um with a tertiary fine component where 95% or more of the mass of the sample is less than about 1 um and more than 85% of the sample is less than about 0.5 um in particle size.

DETAILED DESCRIPTION OF THE INVENTION

This invention is related to a blended hydrous kaolin clay product that can be used as a raw material component in the sintering of cordierite ceramic honeycombs with enhanced thermal properties. The blended product is composed of a coarse, platy, hydrous kaolin clay and a fine hydrous kaolin clay. The combination of these two materials is expected to enhance the thermomechanical properties of cordierite honeycombs by creating a mechanism to manipulate the degree of cordierite crystal orientation in the final product.

The use of fine clay in combination with a larger delaminated clay would have several advantages. The fine clay could be used to moderate orientation of the delaminated kaolin and talc during extrusion resulting in a cordierite crystal structure that is oriented to maintain a low coefficient of thermal expansion while minimizing the degree of anisotropic thermal expansion in the axial and transverse directions of the ceramic honeycomb. This would reduce the degree of microcracking associated with temperature variations typically observed during normal catalytic converter or filtering operations. The fine particle size clay also enables improved particle packing within the green body. The finer hydrous clay would fill voids between other larger raw material crystals that calcined clay could not. The improved particle packing within the green body would increase the green strength eliminating product deformation prior to drying and firing of the substrate.

It is desirable to have a more homogenous distribution of cordierite precursors within the green body which would potentially be enabled by the addition of a fine hydrous kaolin component. Increased homogeneity would enable improved conversion of the precursors into cordierite and limit the formation of impurity phases within the crystal structure that would increase the coefficient of thermal expansion of the overall ceramic. The increased surface area and reduced crystallinity associated with a finer, hydrous clay would also have a lower reaction temperature that would enable reduced temperature or firing time of the substrate without impacting the overall conversion to cordierite. This would reduce the energy costs associated with product manufacture.

One embodiment of this invention is the use of a platy (but not necessarily delaminated) coarse, hydrous kaolin component in combination with a fine, hydrous kaolin component. In this embodiment, the fine kaolin would serve the same function of moderating platelet orientation during extrusion of the cordierite-forming blend, but if a non-delaminated coarse component is used, then the ratio of the fine component relative to the coarse component would be reduced to compensate for using a non-delaminated (less platy) coarse component.

In another embodiment of the invention, a blended hydrous kaolin clay product consists of a blend of (1) a delaminated hydrous kaolin clay with a mean particle diameter of less than about 2 um (the coarse kaolin component), and (2) a fine hydrous kaolin clay with a mean particle diameter of less than about 1 um (the fine kaolin component). The particle sizes have been measured using a Micromeritics Sedigraph Model 5100 instrument. The weight ratio of the coarse kaolin component to the fine kaolin component can be in the range of from about 10:90 to about 90:10 or, alternatively, in the range of about 50:50 to about 90:10 or, alternatively, in the range of about 70:30 to about 90:10. The precise selection of the weight ratio of the coarse kaolin component to the fine kaolin component will depend on the composition sought in the final product (i.e., the precise ratio of the kaolin blend will depend on the other raw materials and the precise amounts which comprise the batch used in making the cordierite), and the desired properties of the final product (e.g., improved coefficient of thermal expansion, improved dimensional accuracy, reduced tendency toward cracking, overall porosity, and pore size). A person skilled in the art would know, without undue experimentation, the ratio of the coarse to fine kaolin components needed depending on the other raw materials used in making the cordierite. The blending of the coarse and fine kaolin components could take place at any point during the mining and processing of the clay. This includes mixing the individual crude components during initial makedown, prior to spray drying, after spray drying, or as a product in slurry form. The coarse and fine kaolin components could also be added to the cordierite raw materials batch as individual components as long as the net result is the addition of two kaolin components that would form a blend with the properties outlined in this document.

Another embodiment of the invention is the use of clay mined from tertiary crude deposits as the fine component of the blend in combination with a Cretaceous or secondary clay. Kaolin crudes have physical properties that reflect the time period in which they were formed. Tertiary crudes are typically finer in size, have different trace elemental profiles such as higher $Fe_2O_3$ content, and have higher densities than clays deposited at other time periods. Tertiary clay consists of Cretaceous clay (originally deposited 65 to 136 million years ago) that was eroded and redeposited 37 to 53 million years ago. Blends consisting of coarse and tertiary kaolin that are finer than 75% at 2 um and 55% at 1 um, respectively, as measured by a Sedigraph 5100 would be suitable for improved cordierite production. Blended samples meeting these criteria have been produced by mixing a delaminated, coarse component, in which less than 85% of the total particle mass is less than about 2 um, with a tertiary fine component, in which 95% or more of the mass of the sample is less than about 1 um and more than 85% of the fine component sample is less than about 0.5 um in particle size. Impurity profiles for the blended kaolin samples containing <about 0.1% $Na_2O$, <about 0.25% $K_2O$, <about 1.75% $TiO_2$, <about 0.6% $Fe_2O_3$, <about 0.1% CaO, and <about 0.1% $P_2O_5$ should be met in order to produce high performance cordierite.

Example 1

Example 1 contains several samples produced from blends of fine particle size kaolin and coarse, delaminated kaolin streams obtained from BASF's kaolin manufacturing operations. The coarse delaminated streams are derived from two different sources of coarse, white clays in the Middle Georgia area. These samples are labeled Coarse #1 and #2. Coarse sample #1 (~56% solids) was delaminated, flocked with acid and alum, filtered and redispersed with a polyacrylate dispersant. Coarse sample #2 (~54% solids) was delaminated and did not require further processing other than addition of polyacrylate because of high solids processing. The fine clays consisted of a tertiary kaolin (T1) mined from the Middle Georgia area and a tertiary kaolin (T2) mined from the East Georgia area. Both of the tertiary kaolins were flocked with acid and alum, filtered, and redispersed with a polyacrylate dispersant. The individual samples were produced by blending the delaminated and fine particle size kaolin streams. Sample #1 contains a 90% by weight blend of Coarse #1 and 10 wt % of T1. Sample #2 contains a 90 wt % of Coarse #2 and 10 wt % of T1. Sample #3 contains 90 wt % of Coarse #1 and 10 wt % of T2. Sample #4 contains 90 wt % of Coarse #2 and 10 wt % of T2. Table 1-1 contains elemental analysis of the four blended samples produced. Table 1-2 contains the particle size distributions of each of the blends as well as the coarse, delaminated and fine, hydrous kaolin components used.

TABLE 1-1

| Sample ID | % $SiO_2$ | % $Al_2O_3$ | % $Na_2O$ | % $K_2O$ | % $TiO_2$ | % $Fe_2O_3$ | % CaO | % MgO | % $P_2O_5$ | % $SO_3$ | % LOI |
|---|---|---|---|---|---|---|---|---|---|---|---|
| Sample 1 | 44.5 | 39.2 | 0.041 | 0.13 | 1.30 | 0.43 | 0.03 | 0.03 | 0.06 | 0.04 | 14.2 |
| Sample 2 | 44.3 | 39.4 | 0.019 | 0.05 | 1.39 | 0.31 | 0.04 | 0.02 | 0.06 | 0.03 | 14.3 |
| Sample 3 | 43.8 | 39.9 | 0.042 | 0.13 | 1.29 | 0.45 | 0.03 | 0.03 | 0.05 | 0.03 | 14.2 |
| Sample 4 | 44.2 | 39.5 | 0.017 | 0.06 | 1.34 | 0.33 | 0.04 | 0.02 | 0.03 | 0.02 | 14.3 |
| Coarse #1 | 44.5 | 39.2 | 0.054 | 0.13 | 1.38 | 0.38 | 0.03 | 0.03 | 0.04 | 0.07 | 14.0 |
| Coarse #2 | 44.6 | 39.2 | 0.024 | 0.04 | 1.48 | 0.24 | 0.04 | 0.02 | 0.07 | 0.04 | 14.1 |

TABLE 1-2

| PSD | Sample 1 | Sample 2 | Sample 3 | Sample 4 | Coarse #1 | Coarse #2 | T1 | T2 |
|---|---|---|---|---|---|---|---|---|
| % < 10 um | 99 | 99 | 100 | 99 | 98 | 99 | 99 | 100 |
| % < 5 um | 98 | 96 | 97 | 96 | 90 | 95 | 99 | 98 |
| % < 2 um | 83 | 81 | 83 | 81 | 79 | 73 | 98 | 98 |
| % < 1 um | 67 | 64 | 67 | 64 | 61 | 59 | 97 | 98 |
| % < 0.5 um | 49 | 43 | 48 | 44 | 39 | 42 | 90 | 92 |
| % < 0.2 um | 23 | 20 | 23 | 21 | 17 | 20 | 52 | 20 |

Example 2

Example 2 contains another embodiment of the described invention. The blend was produced with a fine, hydrous and a coarse, delaminated kaolin with the blend ratio adjusted to increase the fine component. The sample was produced using coarse, white kaolin that was delaminated prior to blending. The fine kaolin was derived from a tertiary kaolin crude mined from the Middle Georgia area that was flocked with acid and alum, filtered, and redispersed with a polyacrylate dispersant. Sample #5 contains a 70% by weight blend of the coarse, delaminated clay and 30 wt % of a Middle Georgia Tertiary kaolin. Table 2-1 contains the elemental analysis obtained from this sample and Table 2-2 shows the resulting particle size distribution.

TABLE 2-1

| Sample ID | % $SiO_2$ | % $Al_2O_3$ | % $Na_2O$ | % $K_2O$ | % $TiO_2$ | % $Fe_2O_3$ | % CaO | % MgO | % $P_2O_5$ | % $SO_3$ | % LOI |
|---|---|---|---|---|---|---|---|---|---|---|---|
| Sample 5 | 44.8 | 38.7 | 0.026 | 0.08 | 1.18 | 0.44 | 0.04 | 0.03 | 0.08 | 0.05 | 14.44 |

TABLE 2-2

| PSD | Sample 5 | Coarse #2 | T1 |
|---|---|---|---|
| % < 10 um | 99 | 96 | 100 |
| % < 5 um | 97 | 96 | 100 |
| % < 2 um | 86 | 80 | 98 |
| % < 1 um | 72 | 60 | 98 |
| % < 0.5 um | 54 | 36 | 93 |
| % < 0.2 um | 27 | 14 | 57 |

TABLE 3-1

| | Sample 6 | Sample 7 | Sample 8 |
|---|---|---|---|
| Surface Area ($m^2/g$) | 18.3 | 7.5 | 14.0 |
| PSD | | | |
| % < 10 um | 100 | 83 | 99 |
| % < 5 um | 98 | 50 | 96 |
| % < 2 um | 87 | 23 | 78 |
| % < 1 um | 76 | 13 | 59 |
| % < 0.5 um | 59 | 7 | 35 |
| % < 0.2 um | 23 | 2 | 11 |

Example 3

In order to demonstrate the benefits of the invention to cordierite formation, cordierite pieces were extruded and fired using the proposed blend (Sample 6) as compared to a coarse kaolin (Sample 7) and a delaminated kaolin (Sample 8). Table 3-1 contains physical property data and Table 3-2 contains elemental analysis for the three kaolin samples examined. The particle size for each sample was measured via Sedigraph and the surface area was determined by BET. Elemental analysis on the kaolin samples was obtained using XRF.

TABLE 3-2

| Sample Id: | % $SiO_2$ | % $Al_2O_3$ | % $Na_2O$ | % $K_2O$ | % $TiO_2$ | % $Fe_2O_3$ | % CaO | % MgO | % $P_2O_5$ | % LOI |
|---|---|---|---|---|---|---|---|---|---|---|
| Sample 6 | 45.8 | 39.5 | 0.03 | 0.09 | 1.11 | 0.52 | 0.02 | 0.04 | 0.05 | 14.8 |
| Sample 7 | 46.1 | 39.7 | 0.02 | 0.09 | 0.96 | 0.26 | 0.02 | 0.02 | 0.03 | 14.1 |
| Sample 8 | 45.7 | 39.5 | 0.02 | 0.06 | 1.51 | 0.30 | 0.03 | 0.03 | 0.05 | 14.4 |

The cordierite pieces were formed by mixing raw materials consisting of each individual hydrous kaolin sample, alumina $Al_2O_3$), (and talc ($Mg_3Si_4O_{10}(OH)_2$) in a method known to the skilled person. Samples of commercially available high purity talc (Sample 13) and alumina (Sample 12) for cordierite applications were used and the typical properties are listed in Tables 3-3 and 3-4. No organic additives were used to form the raw batch. The water content of the batch ranged from about 32 to about 36% in order to provide the plasticity necessary to extrude the material. The kaolin, alumina and talc precursors were blended in a ratio to form stoichiometric cordierite with Sample 9 being formed from Sample 6, Sample 10 from Sample 7, and Sample 11 from Sample 8.

TABLE 3-3

|  | Sample 12 | Sample 13 |
|---|---|---|
| Surface Area (m$^2$/g) | 8.9 | 11.4 |
| PSD |  |  |
| Cilas d90 (um) | 2 | N/A |
| Cilas d50 (um) | 0.5 | N/A |

TABLE 3-4

| Sample Id: | SiO2 | Al2O3 | Na2O | TiO2 | Fe2O3 | MgO | CaO | LOI |
|---|---|---|---|---|---|---|---|---|
| Sample 12 | 0.03 | 99.8 | 0.07 | N/A | 0.02 | 0.05 | 0.02 | N/A |
| Sample 13 | 60.4 | 0.30 | 0.18 | <0.1 | 1.40 | 31.7 | 0.25 | 5.20 |

The raw material batches were extruded using a piston extruder to form solid rods. The samples were dried initially at 110° C. in a drying oven. Samples were then fired in a high temperature furnace using a ramp rate of 5° C./min to 1280° C. with a hold time of 1 hour to produce stoichiometric cordierite. The coefficient of thermal expansion (CTE) for the three cordierite samples was measured using an Orton Model 1600 dilatometer (Table 3-5). Sample 9 produced using the novel kaolin blend of a fine, hydrous and a coarse, delaminated kaolin (Sample 6) resulted in a CTE of 2.7×10$^{-6}$ as compared to the control cordierite Samples 10 and 11 produced using Kaolin Samples 7 and Sample 8. This was a reduction in CTE of 60% demonstrating the ability to improve thermal performance in cordierite ceramic bodies and substrates through the use of the novel kaolin blend.

TABLE 3-5

| Sample | CTE (10$^{-6}$/K) | Temp. Range (° C.) |
|---|---|---|
| Sample 9 | 2.7 | 400-800 |
| Sample 10 | 6.8 | 400-800 |
| Sample 11 | 6.8 | 400-800 |

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A method of making cordierite comprising: mixing, extruding and sintering a cordierite precursor comprising a blended hydrous kaolin clay product comprising
   (a) a platy coarse kaolin clay having a mean particle size of less than 2 μm in diameter; and
   (b) a fine, hydrous kaolin clay having a mean particle size of less than 1 μm in diameter, wherein the blended hydrous kaolin clay product has a total particle mass where more than about 75% and 86% or less of the total particle mass is less than 2 μm as measured by a Sedigraph 5100.

2. The method of claim 1, wherein the platy coarse kaolin clay is delaminated kaolin clay.

3. The method of claim 1, wherein the weight ratio between the platy coarse kaolin clay and the fine, hydrous kaolin clay is between about 10:90 and about 90:10.

4. The method of claim 1, wherein the weight ratio between the platy coarse kaolin clay and the fine, hydrous kaolin clay is between about 50:50 and about 90:10.

5. The method of claim 1, wherein the weight ratio between the platy coarse kaolin clay and the fine, hydrous kaolin clay is between about 70:30 and about 90:10.

6. The method of claim 1, wherein the platy coarse kaolin clay is a Cretaceous or secondary clay and the fine, hydrous kaolin clay is clay mined from tertiary crude deposits.

7. The method of claim 6, wherein the impurity profile for the blended clay product is less than about 0.1% Na$_2$O, less than about 0.25% K$_2$O, less than about 1.75% TiO$_2$, less than about 0.6% Fe$_2$O$_3$, less than about 0.1% CaO, and less than about 0.1% P$_2$O$_5$ by weight.

8. The method of claim 7, wherein the weight ratio between the tertiary crude deposits clay and the Cretaceous or secondary clay is between about 90:10 and about 10:90.

9. The method of claim 7, wherein the weight ratio between the tertiary crude deposits clay and the Cretaceous or secondary clay is between about 50:50 and about 10:90.

10. The method of claim 7, wherein the weight ratio between the tertiary crude deposits clay and the Cretaceous or secondary clay is between about 30:70 and about 10:90.

11. A method of forming a blended hydrous kaolin clay product, the method comprising blending clay mined from tertiary crude deposits as a fine component with a Cretaceous or secondary clay,
   wherein the Cretaceous or secondary clay is a platy coarse kaolin clay having a mean particle size of less than 2 μm in diameter; and
   the fine component is a fine, hydrous kaolin clay having a mean particle size of less than 1 μm in diameter, and
   wherein the blended hydrous kaolin clay product has a total particle mass where more than about 75% and 86% or less of the total particle mass is less than 2 μm as measured by a Sedigraph 5100.

* * * * *